United States Patent Office 2,900,342
Patented Aug. 18, 1959

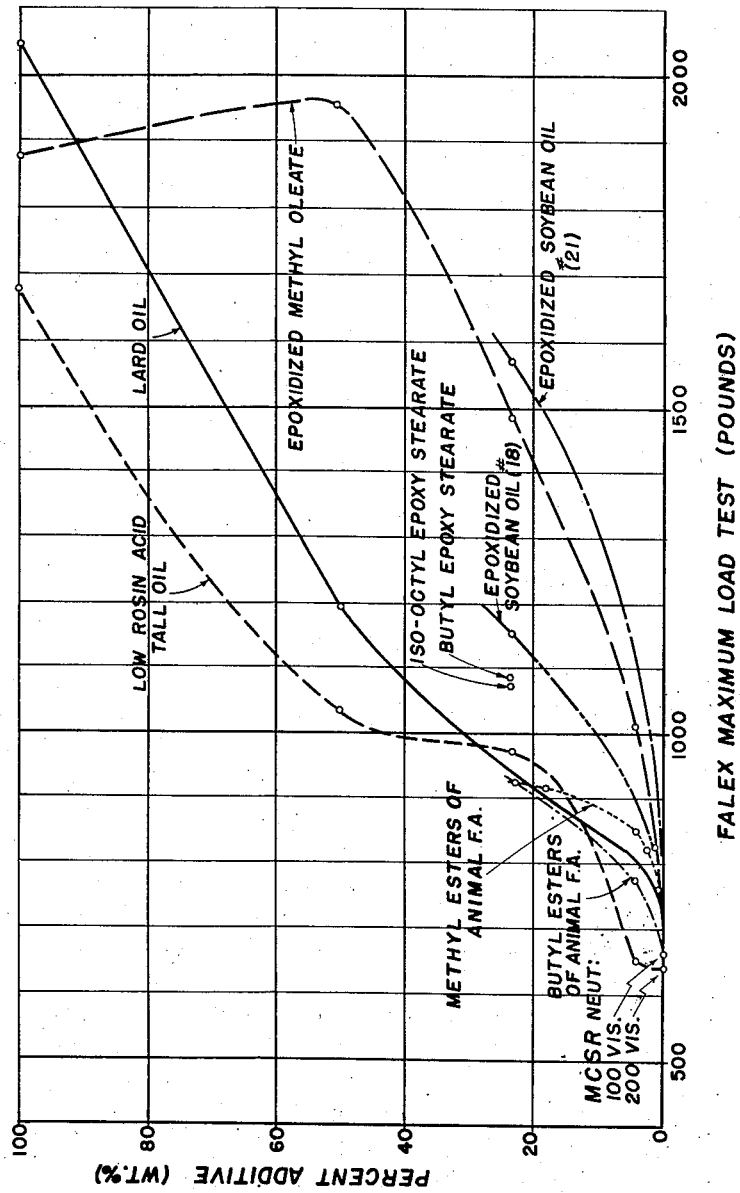

2,900,342

LUBRICANTS

Allan A. Manteuffel, Crystal Lake, George R. Cook, Des Plaines, and Warren W. Cortiss, Crystal Lake, Ill., assignors to The Pure Oil Company, Chicago, Ill., a corporation of Ohio Application December 18, 1956, Serial No. 629,076

8 Claims. (Cl. 252—57)

This invention relates to the use of epoxidized alkyl esters of unsaturated fatty acids as lubricants, both with and without a mineral oil base, and to a process of lubricating, using the aforementioned compounds per se and with a lubricating oil.

Fatty epoxides are used as polyvinyl chloride plasticizers and stabilizers for various plastics. Also, the development of uses of fatty epoxides has gone forward because of the improved methods of preparation which have become available. Fatty epoxides undergo many reactions which make them valuable as chemical intermediates. The hydrolyzing of fatty epoxides, in the presence of an acid solution, produces vicinal glycols. This makes it possible to hydroxylate adjacent carbon atoms joined by a double bond. Olefins, such as 9,10-dihydroxy stearic acid, may be cleaved at the carbon double bonds by conversion to the diol followed by 1,4-diradical cleavage to form azelaic acid and pelargonic acids which are potential plasticizers or constituents of lubricating compositions used in jet engines. Lead tetraacetate may be the cleavage agent, as may periodic acid, potassium permanganate, sodium bismuthate, certain organic iodoso diacetates, chromic acid, and chromyl chloride. Another reaction of fatty epoxides is that with ammonia or amines to form alkylolamines. As is commonly known at this time, epoxy derivatives may react with or replace polyhydric alcohols and polycarboxylic acids or their anhydrides to form alkyl-type resins or epoxy resins. Soybean oil which has been epoxidized with hydrogen peroxide has been used in resin adhesive formulations to impart better tensile strength. There are other indications in the art that epoxidized fatty materials are useful in the preparation of modified products. Thus, by subjecting fatty epoxides to pyrolysis, conjugated dienes are formed, useful as drying oils which dry rapidly, giving tacky films because of the predominance of trans double linkages in the pyrolysis product. Other reactions include the addition of active hydrogen compounds such as mercaptans to form flotation agents, detergent synergists and additives for lubricating oils, and hydrogenation and reduction.

The present invention is based on the discovery that epoxidized fatty materials have lubricating properties and may be used per se as lubricants or when blended with mineral lubricating oils. For these purposes, compounds of the formula:

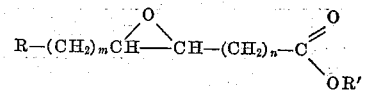

where R is selected from the group of alkyl radicals of 1 to 6 carbon atoms, R' is selected from the group of alkyl radicals of 1 to 8 carbon atoms, $m$ is an integer of from 0 to 7, and $n$ is an integer of from 5 to 7, may be used. The unsaturated fatty acids may be selected from the acids present in fats and oils, such as lauroleic ($C_{12}H_{22}O_2$), myristoleic ($C_{14}H_{26}O_2$), palmitoleic $$(C_{16}H_{30}O_2)$$

oleic ($C_{18}H_{34}O_2$), gadoleic ($C_{20}H_{38}O_2$), erucic $$(C_{22}H_{42}O_2)$$

ricinoleic ($C_{18}H_{34}O_3$), linoleic ($C_{18}H_{32}O_2$), linolenic ($C_{18}H_{30}O_2$), eleostearic ($C_{18}H_{30}O_2$), licanic $C_{18}H_{28}O_3$), arachidonic ($C_{20}H_{32}O_2$) and clupanodonic ($C_{22}H_{36}O_2$). These various fatty acids may be epoxidized and then esterified, or the esterification may precede the epoxidation. Since epoxidation results in the saturation of the carbon chain of the acid, the chemical name for the end product changes to that of its saturated form. Thus, epoxidized methyl oleate would become methyl epoxy stearate.

It becomes then a primary object of this invention to provide a lubricant comprising compounds of the formula:

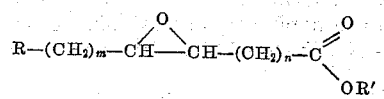

where R is an alkyl group having 1 to 6 carbon atoms, R is an alkyl radical having from 1 to 8 carbon atoms, $m$ is an integer of from 0 to 7 and $n$ is an integer of from 5 to 7.

A second object of the invention is to provide a mineral lubricating composition containing a sufficient quantity of a compound or mixtures of compounds falling within the above formula to impart thereto superior load-carrying ability.

A third object of the invention is to provide a method of lubricating moving metallic parts by introducing into contact therewith a composition comprising epoxidized alkyl esters of unsaturated fatty acids coming within the above general formula.

These and other objects of the invention will become apparent as the description thereof proceeds.

In order to demonstrate the invention, a series of experiments were conducted on a number of mineral oil compositions containing various amounts of lard oil, mineral oil compositions containing various amounts of epoxidized fatty esters coming within the scope of the invention, and mineral oil without the presence of a load-carrying agent. The results are shown in the following table including stability tests and Falex tests.

Table I

| Blend | Composition by wt. percent | | | | Stab. @ 90 days | | Falex Max Load Torque Test (pounds) |
|---|---|---|---|---|---|---|---|
| | 80 Vis. Neut. | 200 Vis. Neut. | Fatty oil | | 120° F. | Approx. 80° F. | |
| | | | Amount | Type | | | |
| #1 | 68 | 28 | 4 | Lard oil | Pass | Pass | 806 |
| #2 | 5 | 88 | 7 | do | do | Borderline | 813 |
| #3 | 5 | 84 | 11 | do | do | Sep'n | 840 |
| #4 | 5 | 77 | 18 | do | do | do | 920 |
| #5 | 5 | 72 | 23 | do | do | do | 940 |
| #6 | 50 | | 50 | do | do | do | 1,193 |
| #7 | | | 100 | do | do | do | 2,050 |
| #8 | 71 | 29 | | | do | Pass | 666 |
| #9 | 5 | 95 | | | do | do | 641 |
| #10 | 70 | 29 | 1 | Epoxidized methyloleate | do | do | 764 |
| #11 | 70 | 28 | 2 | do | do | do | 822 |
| #12 | 68 | 28 | 4 | do | do | do | 1,008 |
| #13 | 5 | 72 | 23 | do | do | do | 1,476 |
| #14 | 50 | | 50 | do | do | do | 1,956 |
| #15 | | | 100 | do | do | do | 1,875 |
| #16 | 68 | 28 | 4 | Methyl esters of animal fatty acids. | Cloudy | Cloudy | 850 |
| #17 | 5 | 72 | 23 | do | Sediment | Sediment | 925 |
| #18 | 68 | 28 | 4 | Butyl esters of animal fatty acids. | Pass | Pass | 772 |
| #19 | 5 | 72 | 23 | do | do | do | 925 |
| #20 | 6 | 71 | 23 | Epoxidized soybean oil acid. | do | do | 1,155 |
| #21 | 6 | 71 | 23 | Iso-octyl epoxy stearate | do | do | 1,082 |
| #22 | 6 | 71 | 23 | Butyl epoxy stearate | do | do | 1,086 |
| #23 | 6 | 71 | 23 | Epoxidized soybean oil acid. | do | do | 1,580 |
| #24 | 6 | 71 | 23 | Methyl epoxy stearate | do | do | 1,082 |

Referring to Table I, the value under "Falex max. load torque test" represents an average of 8 to 10 runs using a Falex #10 journal. Blends 1–5 represent lubricating compositions containing mineral oil as the major component with lard oil as the minor component representing the fatty oil constituent. Such compositions are commercially available and are primarily used where a moderate level of lubrication is required as in cutting oil compositions. Blends 6 and 7 further illustrate the fatty oil type of composition, with the fatty oil being a major component in Blend 6 and the only component in Blend 7. Blends 10 through 14 are exemplary of compositions made in accordance with this invention, each containing epoxidized methyl oleate (EMO) and mineral oil. Even though Blend 15, consisting of epoxidized methyl oleate alone, is not equal to lard oil alone (Blends 1–5) in lubricity, as measured by the Falex maximum-load torque test, a comparison of Blends 10–14 with Blends 1–6 shows that the combination of EMO and mineral oil is superior to lard oil and mineral oil. Comparison of Blends 10–15 with 16 and 17 shows the effect of epoxidization.

Blends 16–19 show the relative ineffectiveness of varying amounts of methyl and butyl esters of animal fatty acids. Blends 20–24 are further illustrative of the invention using epoxidized fatty materials. The epoxidized soybean oil acid of blend 20 differed slightly in physical properties from that of Blend 23 as will be shown subsequently. The methyl epoxy stearate used in Blend 24 is a different source material than that used in Blends 10–15; both being epoxidized methyl oleate, but having different physical properties.

The superiority of epoxidized fatty material-mineral oil blends over lard oil-mineral oil blends is shown by reference to the diagram of this invention wherein the curves show that EMO-containing blends are superior to lard oil blends, even up to a concentration greater than 50% by weight. The broken portions of the curves represent extrapolations of the experimental data and indicate that the compositions of this invention are superior up to an EMO concentration of 90% or more. For economic reasons, the upper concentration of epoxidized fatty material is preferably limited to about 50% by weight.

The mineral oils used in these experiments had the following characteristics:

Table II

| 85-100 High VI Neut. | | 200-85 Intermediate VI Neut. | |
|---|---|---|---|
| Flash, ° F | 395 | Flash, ° F | 455 |
| Fire, ° F | 440 | Fire, ° F | 490 |
| Vis. @ 100° F., SUS | 82.1 | Vis. @ 100° F., SUS | 213.3 |
| Vis. @ 210° F., SUS | 37.8 | Vis. @ 210° F., SUS | 46.8 |
| Vis. Index | 100 | Vis. Index | 91 |
| Color (ASTM) | 1+ | Color (ASTM) | +2 |
| Pour Point, ° F | 0 | Pour Point, ° F | 0 |
| Car. Residue, percent | 0.01 | Car. Residue, percent | 0.04 |
| Sulfur, percent | 0.07 | Sulfur, percent | 0.44 |
| Acid No. (1948) | 0.03 | Acid No. (1948) | 0.07 |

The physical properties of the epoxidized fatty materials used in the foregoing experiment are shown in Table III.

Table III

| Epoxy-Fatty Material | Epoxidized methyl oleate | Butyl Epoxy Stearate (#22) | Epoxidized Soybean oil acid (#23) | Epoxidized Soybean oil acid (#20) | Iso-octyl epoxy stearate (#10-15) |
|---|---|---|---|---|---|
| Physical Characteristics: | | | | | |
| Oxirane, percent | 4.6 | 3.8 | 6-6.4 | 6.4 | 3.0-8.0 |
| Iodine No | 5.3-6.1 | 4.0 | 4.0-6.0 | 1.0-3.0 | 2.0-4.0 |
| Acid No. (1948) | 1.3-1.55 | 1.0 | 0.3 | 0.3 | 1.0 |
| Sap. No. (ASTM D-94) | 183 | 160 | 180 | | |
| Color (Sayboldt) | +10 | (yellow) | (light) | (light) | (light) |
| API Gravity, degrees | 21.5 | | | | |
| Hydroxy value | 12.1 | 20 | 20 | | |
| Vis @ 100° F., SUS | 54.0 | | | | |
| Pour Point, ° F | +35 | 9 | 32 | | |
| Odor | Mild | Mild | Mild | | |
| Sp. Gr. (25° C.) | | 0.909 | 0.991 | 0.998 | 0.900 |
| Mol. Wt | | 352 | 1,000 | 1,000 | 370 |
| Flash Pt., ° F | | 390 | 585 | 590 | 390 |
| Fire Point, ° F | | 450 | 640 | 600 | 450 |

The esters of animal fatty acids, before epoxidization, had the following characteristics:

*Table IV*

|  | Methyl esters | | Butyl esters |
|---|---|---|---|
|  | | Typical range | |
| Iodine No | 71.9 | 65–75 | 41.9 |
| Free fatty acid, percent | 4.1 | 0.1–5.0 |  |
| Sap. No | 194.2 | 185–200 | 171 |
| Cloud point, °F | +54 | +48–+54 |  |
| API gravity, degrees | 28.1 | 28.0–29.8 | 30.7 |
| Pour point, °F | +50 | +40–+50 | +50 |
| Vis. @ 100° F., SUS | 47.6 | 42.0–47.9 | 48.7 |
| Color (NPA) | +3 | 1–4 |  |

Numerous examples of epoxidized alkyl esters of unsaturated fatty acids coming within the general formula heretofore discussed are expressed as follows. The number appearing before the epoxy as "7-epoxy" indicates the location of the epoxy linkage between the 7th and 8th carbon atoms of the fatty acid chain. Thus "9-epoxy isopropyl tridecoate has the epoxy

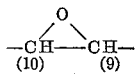

linkage at the 9th and 10th carbon atoms.

7-epoxy methyl undecoate
7-epoxy ethyl undecoate
7-epoxy propyl undecoate
7-epoxy isopropyl undecoate
7-epoxy butyl undecoate
7-epoxy isobutyl undecoate
7-epoxy sec-butyl undecoate
7-epoxy tert-butyl undecoate
8-epoxy methyl laurate
8-epoxy ethyl laurate
8-epoxy propyl laurate
8-epoxy isopropyl laurate
8-epoxy butyl laurate
8-epoxy isobutyl laurate
8-epoxy sec-butyl laurate
8-epoxy tert-butyl laurate
9-epoxy methyl tridecoate
9-epoxy ethyl tridecoate
9-epoxy propyl tridecoate
9-epoxy isopropyl tridecoate
9-epoxy butyl tridecoate
9-epoxy isobutyl tridecoate
9-epoxy sec-butyl tridecoate
9-epoxy tert-butyl tridecoate
7-epoxy methyl tridecoate
7-epoxy ethyl tridecoate
7-epoxy propyl tridecoate
7-epoxy isopropyl tridecoate
7-epoxy butyl tridecoate
7-epoxy isobutyl tridecoate
7-epoxy sec-butyl tridecoate
7-epoxy tert-butyl tridecoate
7-epoxy methyl laurate
7-epoxy ethyl laurate
9-epoxy propyl laurate
9-epoxy isopropyl laurate
9-epoxy butyl laurate
9-epoxy sec-butyl laurate
9-epoxy iso-butyl laurate
9-epoxy tert-butyl laurate
7-epoxy methyl caprate
7-epoxy ethyl caprate
7-epoxy propyl caprate
7-epoxy isopropyl caprate
7-epoxy butyl caprate
7-epoxy sec-butyl caprate
7-epoxy iso-butyl caprate
7-epoxy tert-butyl caprate
8-epoxy methyl undecoate
8-epoxy ethyl undecoate
8-epoxy propyl undecoate
8-epoxy isopropyl undecoate
8-epoxy butyl undecoate
8-epoxy sec-butyl undecoate
8-epoxy iso-butyl undecoate
8-epoxy tert-butyl undecoate
9-epoxy methyl myristate
9-epoxy ethyl myristate
9-epoxy propyl myristate
9-epoxy isopropyl myristate
9-epoxy butyl myristate
9-epoxy sec-butyl myristate
9-epoxy iso-butyl myristate
9-epoxy tert-butyl myristate
9-epoxy methyl pentadecoate
9-epoxy ethyl pentadecoate
9-epoxy propyl pentadecoate
7-epoxy propyl laurate
7-epoxy isopropyl laurate
7-epoxy butyl laurate
7-epoxy isobutyl laurate
7-epoxy sec-butyl laurate
7-epoxy tert-butyl laurate
8-epoxy methyl tridecoate
8-epoxy ethyl tridecoate
8-epoxy propyl tridecoate
8-epoxy isopropyl tridecoate
8-epoxy butyl tridecoate
8-epoxy isobutyl tridecoate
8-epoxy sec-butyl tridecoate
8-epoxy tert-butyl tridecoate
7-epoxy methyl pelargonate
7-epoxy ethyl pelargonate
7-epoxy propyl pelargonate
7-epoxy isopropyl pelarognate
7-epoxy butyl pelargonate
7-epoxy sec-butyl pelargonate
7-epoxy iso-butyl pelargonate
7-epoxy tert-butyl pelargonate
8-epoxy methyl caprate
8-epoxy ethyl caprate
8-epoxy propyl caprate
8-epoxy isopropyl caprate
8-epoxy butyl caprate
8-epoxy sec-butyl caprate
8-epoxy iso-butyl caprate
8-epoxy tert-butyl caprate
9-epoxy methyl undecoate
9-epoxy ethyl undecoate
9-epoxy propyl undecoate
9-epoxy isopropyl undecoate
9-epoxy butyl undecoate
9-epoxy sec-butyl undecoate
9-epoxy iso-butyl undecoate
9-epoxy tert-butyl undecoate
9-epoxy methyl laurate
9-epoxy ethyl laurate
9-epoxy isopropyl pentadecoate
9-epoxy butyl pentadecoate
9-epoxy sec-butyl pentadecoate
9-epoxy iso-butyl pentadecoate
9-epoxy tert-butyl pentadecoate
9-epoxy methyl tricosoate
9-epoxy ethyl behenate
9-epoxy propyl arachidate
9-epoxy isopropyl nondecoate
9-epoxy butyl stearate
9-epoxy methyl stearate
9-epoxy ethyl stearate
9-epoxy propyl stearate
9-epoxy isopropyl stearate
9-epoxy iso-butyl stearate
9-epoxy sec-butyl stearate
9-epoxy tert-butyl stearate
8-epoxy methyl heneicosoate
8-epoxy ethyl nondecoate
7-epoxy propyl margaroate
7-epoxy isopropyl palmititate
8-epoxy methyl myristate
8-epoxy ethyl myristate
8-epoxy propyl myristate
8-epoxy isopropyl myristate
8-epoxy butyl myristate
8-epoxy sec-butyl myristate
8-epoxy iso-butyl myristate
8-epoxy tert-butyl myristate
7-epoxy methyl myristate
7-epoxy ethyl myristate
7-epoxy propyl myristate
7-epoxy isopropyl myristate
7-epoxy butyl myristate
7-epoxy sec-butyl myristate
7-epoxy iso-butyl myristate
7-epoxy tert-butyl myristate The position of the epoxy group is seen to vary from attachment between the 9–10 carbon atoms, the 8–9 carbon atoms and 7–8 carbon atoms. The afore-designated epoxy positions have been called "9-epoxy-," "8-epoxy-" and "7-epoxy-" compounds, respectively, for purposes of this description. The invention is not to be limited to these compounds and the epoxy group may be situated at other positions in the carbon atom chain. In general, straight-chain alkyl groups are included in the definition of R with 1 to 6 carbon atoms, forming thus the aliphatic monobasic acid series. The alkyl groups included in the definition of R' are methyl, ethyl, propyl, isopropyl, butyl, sec-butyl, iso-butyl tertiary butyl groups, up to and including octyl. Either naturally-occurring or synthetic esters may be used in preparing the epoxidized fatty materials found useful in this invention. One particularly useful application of the epoxidized fatty materials of this invention is in cutting oil compositions.

What is claimed is:

1. A lubricating oil composition, exhibiting load-carrying ability, comprising a mineral lubricating oil and from about 1.0 to about 50.0 weight percent of an epoxidized alkyl ester of an unsaturated fatty acid, said esters having the general formula

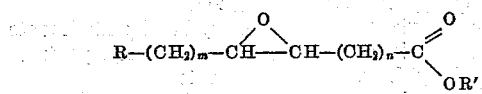

wherein R is an alkyl radical of 1 to 6 carbon atoms, $m$ is an integer of from 0 to 7, $n$ is an integer of from 5 to 7, and R′ is an alkyl group of 1 to 8 carbon atoms.

2. A lubricating oil composition in accordance with claim 1 in which R is a straight-chain saturated alkyl group of from 1 to 6 carbon atoms.

3. A lubricant in accordance with claim 1 in which said ester is 9-epoxy methyl stearate.

4. A lubricant in accordance with claim 1 in which said ester is butyl epoxy stearate.

5. A lubricant in accordance with claim 1 in which said ester is an epoxidized ester obtained from soybean oil acids having an oxirane content of about 6.4% and an iodine value of from 4.0 to 6.0.

6. A lubricating oil in accordance with claim 1 in which said ester is an epoxidized $C_1$–$C_8$ alkyl oleate.

7. A lubricant in accordance with claim 1 in which said ester is an epoxidized $C_1$–$C_8$ alkyl stearate.

8. A lubricant in accordance with claim 1 in which said ester is epoxidized methyl oleate.

References Cited in the file of this patent

UNITED STATES PATENTS

| | | |
|---|---|---|
| 2,210,140 | Colbeth | Aug. 6, 1940 |
| 2,542,550 | McDermott | Feb. 20, 1951 |
| 2,567,930 | Findley et al. | Sept. 18, 1951 |